United States Patent
Asano

(10) Patent No.: US 7,065,552 B2
(45) Date of Patent: Jun. 20, 2006

(54) RELAY COMMUNICATION DEVICE

(75) Inventor: Yoko Asano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 840 days.

(21) Appl. No.: 10/115,981

(22) Filed: Apr. 5, 2002

(65) Prior Publication Data

US 2002/0150124 A1    Oct. 17, 2002

(30) Foreign Application Priority Data

Apr. 12, 2001   (JP) .............................. 2001-113860

(51) Int. Cl.
   *G06F 15/16*    (2006.01)
(52) U.S. Cl. ..................................... 709/203; 358/1.15
(58) Field of Classification Search ................ 709/203; 358/1.15
   See application file for complete search history.

(56) References Cited

U.S. PATENT DOCUMENTS 6,396,592 B1 *  5/2002  Okada et al. .............. 358/1.15
6,424,426 B1 *  7/2002  Henry ....................... 358/1.15
6,690,480 B1 *  2/2004  Maeda ...................... 358/1.15
6,912,062 B1 *  6/2005  Kihara ...................... 358/1.15

* cited by examiner

*Primary Examiner*—David Y. Eng
(74) *Attorney, Agent, or Firm*—Rabin & Berdo P.C.

(57) ABSTRACT

A relay communication device capable of simplifying a method for designating a destination of relay transmission requesting mail to another relay communication device. A CPU reads Subject information stored in a data memory, analyzes the subject information, compares it with an identifying character for relay stored in a relay identification character storing section and judges whether or not a character matching any one of the identifying characters for relay exists in the subject information. If a matched character exists, E-mail is judged to be a relay transmission request. Then, password information is extracted from the subject information and the extracted information is compared with a password being stored in advance in the password information storing section. If the password exists in the subject information and if the existing password matches a password stored in a password storing section, the relay transmission request is implemented.

18 Claims, 9 Drawing Sheets

RELAY COMMUNICATION DEVICE

BACKGROUND OF THE INVENTION

1. Field of the Invention

The present invention relates to a relay communication device and more particularly to the relay communication device having a function of carrying out communications by relay such as an internet FAX (facsimile) or a like.

2. Description of the Related Art

Relay processing in a relay communication device having a relay communication function such as an internet FAX or a like is conventionally performed in such a way as described below. A sender performs the relay processing by addressing by describing ["password" # "transferred-to telephone number" @ "host name" in a column [To:] for an address of a header of E-mail (Electronic Mail) (hereinafter, an "address of a header of E-mail" being referred simply to as a "mail address").

On the other hand, the internet FAX being the relay communication device having received E-mail addressed in the above form identifies a domain name from an address column for the mail address and, if the received E-mail is judged to be E-mail for relay processing and if the identified domain name matches with data (that is, a domain name) registered on the internet FAX, performs relay processing (that is, transmission for relay).

However, there is a problem that, if the conventional relay communication device such as the internet FAX has no function of receiving a specified E-mail transfer protocol, for example, a SMTP (Simple Mail Transfer Protocol), the relay processing cannot be implemented.

Moreover, there is another problem that, in the relay processing by the conventional relay communication device, when a sender (a party requesting for relay transmission) makes a request of relay transmission to a plurality of destinations, ["password" # "transferred-to telephone number" @ "host name"] has to be described in the column [to:] for the mail address in the number of times corresponding to the number of the plurality of the destinations, which causes very cumbersome inputting work, and therefore erroneous inputting easily occurs because the plurality of the destinations is input.

Also, there is still another problem that, in the relay processing by the conventional relay communication device, it is necessary to register a "host name", which is a domain name designated by a sender (a party requesting for relay transmission), to be input subsequent to the mark "@" with a DNS (Domain name system) server on a network in an environment in which the relay communication device such as the internet FAX is used, which also causes cumbersome setting.

Furthermore, there is still another problem that, when the internet FAX has a function of receiving the E-mail transfer protocol, for example, the SMTP and is adapted to function as a mail server, the internet FAX serves as a contact with an outside (that is, with the Internet) and therefore a risk exists from a standpoint of security.

As described above, the conventional relay communication device such as the internet FAX has following problems to be solved. That is, in order to achieve the relay processing in the conventional communication device, it is necessary for the relay communication device itself to have a function of receiving the E-mail transfer protocol, for example, the SMTP or a like. Moreover, when a sender (a party requesting for relay transmission) makes a request for relay transmission to a plurality of destinations, cumbersome inputting to an address column is required and when the plurality of destinations has to be input, errors occur easily in the inputting procedures.

Also, the registration of a domain name designated by a sender (a party requesting for relay) with the DNS server on a network in an environment in which the relay communication device such as the internet FAX is used is required and its setting is cumbersome. Moreover, since the relay communication device is adapted to function as a mail server, it serves as a contact with an outside (that is, with the Internet), problems from a standpoint of security occurs.

SUMMARY OF THE INVENTION

In view of the above, it is an object of the present invention to provide a relay communication device which is capable of simplifying a method for designating a destination of relay transmission requesting mail to a relay communication device, of resolving a fear associated with security in a network in which the relay communication device having a function for relay is connected, and of preventing the relay function of the relay communication device from being abused by a third party.

According to a first aspect of the present invention, there is provided a relay communication device for transferring data fed from a requester for relay transmission to a specified destination based on information about a request for relay transmission made up of an identifying character for relay and destination information, the relay communication device including:

a data memory used to store mail data in E-mail received;

a relay identifying character information storing unit used to store an identifying character for relay being registered in advance;

a relay identifying character extracting unit to extract the identifying character for relay from the information about a request for relay transmission described in a Subject column in a mail header of the E-mail being stored in the data memory;

a relay identifying character judging unit to judge whether or not the identifying character for relay extracted by the relay identifying character extracting unit is stored in the relay identifying character information storing unit;

a destination information extracting unit to extract, when the identifying character for relay is judged to be stored in the relay identifying character information storing unit by the relay identifying character judging unit, the destination information described in the Subject column in the mail header of the E-mail; and a relay processing unit to perform relay processing based on the destination information extracted by the destination information extracting unit.

According to a second aspect of the present invention, there is provided a relay communication device for transferring data fed from a requester for relay transmission to a specified destination based on information about a request for relay transmission made up of an identifying character for relay and destination information, the relay communication device including:

a data memory used to store mail data in E-mail received;

a relay identifying character information storing unit used to store an identifying character for relay being registered in advance;

a relay identifying character extracting unit to extract the identifying character for relay from information about a request for relay transmission described in a MIME (Multipurpose Internet Mail Extension) header being stored in the data memory;

a relay identifying character judging unit to judge whether or not the identifying character for relay extracted by the relay identifying character extracting unit is stored in the relay identifying character information storing unit;

a destination information extracting unit to extract, when the identifying character for relay is judged to be stored in the relay identifying character information storing unit by the relay identifying character judging unit, the destination information described in the MIME header; and a relay processing unit to perform relay processing based on the destination information extracted by the destination information extracting unit.

According to a third aspect of the present invention, there is provided a relay communication device for transferring data fed from a requester for relay transmission to a specified destination based on information about a request for relay transmission made up of an identifying character for relay and destination information, the relay communication device including:

a data memory used to store mail data in E-mail received;

a relay identifying character information storing unit used to store an identifying character for relay being registered in advance;

a relay identifying character extracting unit to extract the identifying character for relay from the information about a request for relay transmission described in a main body of the E-mail;

a relay identifying character judging unit to judge whether or not the identifying character for relay extracted by the relay identifying character extracting unit is stored in the relay identifying character information storing unit;

a destination information extracting unit to extract, when the identifying character for relay is judged to be stored in the relay identifying character information storing unit by the relay identifying character judging unit, the destination information described in a main body of the E-mail; and a relay processing unit to perform relay processing based on the destination information extracted by the destination information extracting unit.

In the foregoing, a preferable mode is one wherein the relay processing unit, when the identifying character for relay is judged to be stored by the relay identifying character judging unit, based on destination information on which editing processing is performed by a destination information editing unit used to perform specified editing processing on the destination information based on a type of a connected line identified by the destination information, performs editing processing.

Also, a preferable mode is one wherein the data memory stores mail data of E-mail decrypted by a decrypting unit which receives E-mail transmitted after being encrypted and decrypts the received E-mail.

Also, a preferable mode is one wherein the information about a request for relay transmission includes password information and wherein further includes a password information storing unit to store password information being registered in advance, a password information extracting unit to extract password information from the information about a request for relay transmission described in the E-mail being stored in the data memory, and a password information judging unit to judge whether or not the password information extracted by the password information extracting unit is stored in the password information judging unit and wherein the relay processing unit, when the identifying character for relay is judged, by the relay identifying character judging unit, to be stored and the password information is judged, by the password information judging unit, to be stored, extracts the destination information described in the E-mail and performs relay processing based on the destination information.

Also, a preferable mode is one wherein the E-mail is received through a mail server.

Also, a preferable mode is one wherein the relay communication device is a facsimile device which transforms mail data of the E-mail into data that is able to be received and processed by the facsimile device and transfers the data based on the destination information and in accordance with facsimile transmission procedures.

According to a fourth aspect of the present invention, there is provided a relay communication device for transferring data fed from a requester for relay transmission to a specified destination based on information about a request for relay transmission made up of an identifying character for relay and destination information, the relay communication device including:

a unit to receive E-mail through a mail server;

a unit to extract the information about a request for relay transmission from the received E-mail; and a unit to transmit, based on destination information contained in the extracted information about a request for relay transmission, the E-mail data, through a public telephone line, to a device to which the E-mail data is transferred.

In the foregoing, a preferable mode is one wherein the relay communication device is a facsimile device which transforms mail data of the E-mail into data that is able to be received and processed by the facsimile device and transfers the data based on the destination information and in accordance with facsimile transmission procedures.

With the above configurations, since E-mail is received by using an E-mail receiving procedure and whether or not the E-mail is a request for relay transmission is judged by analyzing Subject information contained in the E-mail, a method for designating a destination of a relay transmission request mail to the relay communication device can be made the same as that for designating a destination of a transmission mail to an internet FAX, special time and effort required for designating a destination are made unnecessary.

Moreover, in a network in which a relay communication device is connected, time and effort required for registering a transferring host name of the relay communication device with a DNS is made unnecessary.

Also, since the relay communication device does not serve as a direct contact with an outside, that is, it does not use the SMTP function (that is, function as a mail server), a fear associated with security in a network having a relay communication device using a relay function can be resolved and, in addition, even if a relay communication device has no function of receiving the SMTP, it can perform the relay transmission requesting function. Also, abuse of the relay function of the internet FAX by a third party can be prevented by double walls using an identifying character for relay and a password. Furthermore, when a relay transmission request is made of a plurality of destinations, a destination designating method can be made simpler and an erroneous key operation in inputting can be avoided.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

First Embodiment

Hereinafter, a description will be made by taking an internet FAX as an example of the relay communication device.

Figure 1:
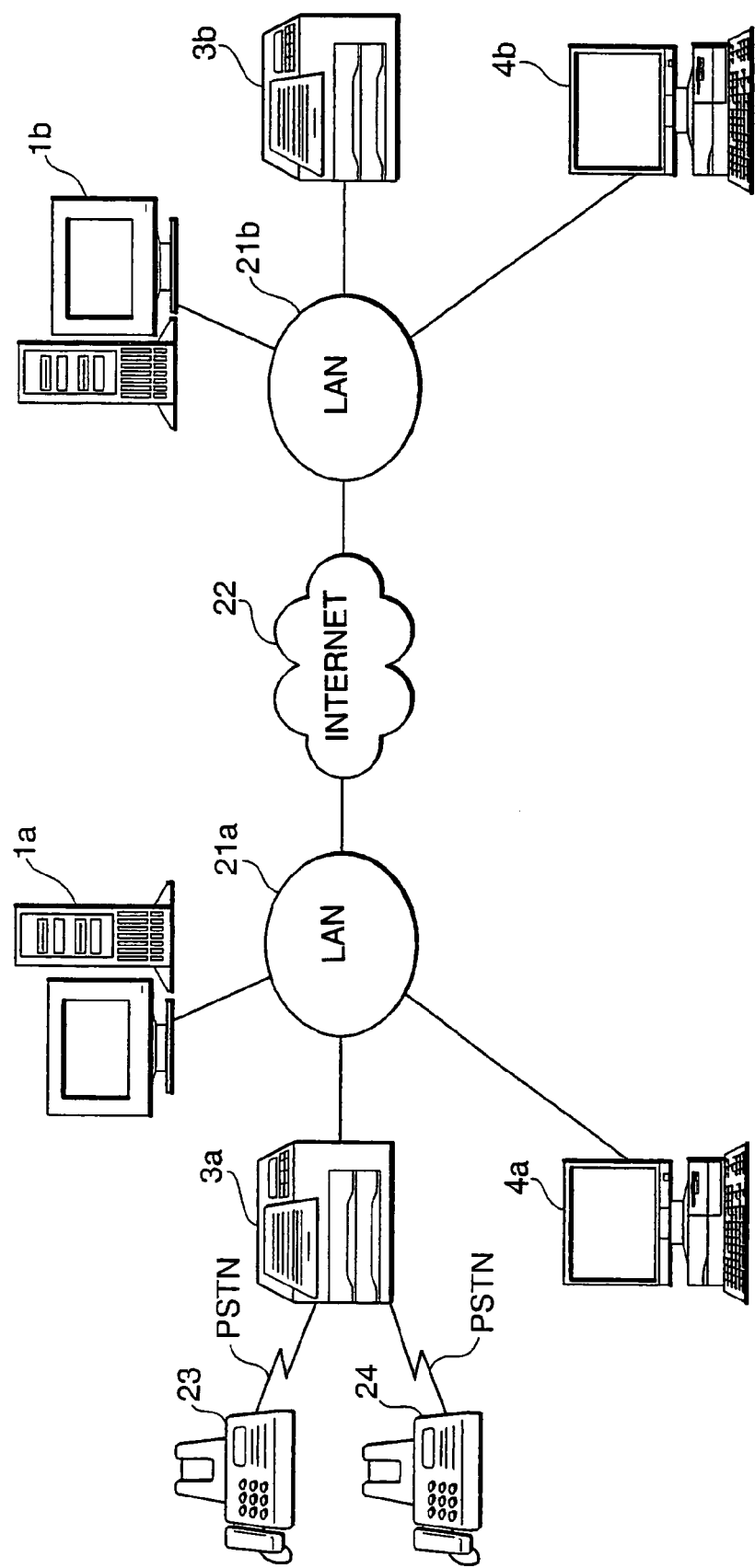
FIG. 1 is a diagram illustrating an example of configurations of a network in which a relay operation is performed by a relay communication device (an internet FAX in the embodiment) of a first embodiment of present invention.

FIG. 1 is a diagram illustrating an example of configurations of a network in which a relay operation is performed by an internet FAX of a first embodiment of present invention.

In a network shown in FIG. 1, a mail server 1b, an internet FAX 3b, and a personal computer 4b are connected to one another through a LAN (Local Area Network) 21b, while a mail server 1a, an internet FAX 3a, and a personal computer 4a are connected to one another through a LAN (Local Area Network) 21a. Moreover, the internet FAX 3a is connected to a G3FAX 23 and a G3FAX 24 through a PSTN (Public Switched Telephone Network). Also, the LAN 21a is connected to the LAN 21b through the Internet 22.

Figure 2:
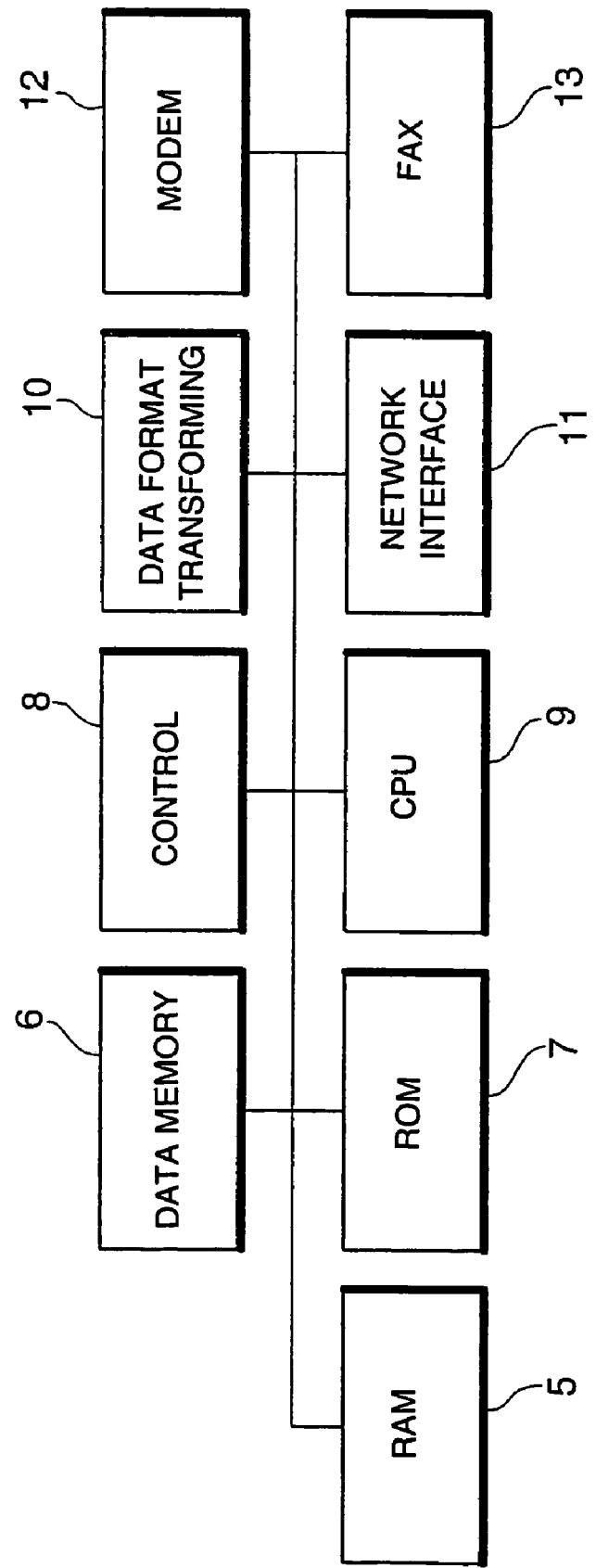
FIG. 2 is a block diagram showing basic configurations of a relay communication device (internet FAX) of the first embodiment of the present invention.

FIG. 2 is a block diagram showing basic configurations of the internet FAX of the first embodiment of the present invention. As shown in FIG. 2, the internet FAX 3a of the first embodiment includes a RAM (Random Access Memory) 5, a data memory 6, a ROM (Read Only Memory) 7, a control section 8, a CPU (Central Processing Unit) 9, a data format transforming section 10, an network interface section 11, a MODEM (Modulator and Demodulator) 12, and a FAX section 13.

Figure 3:
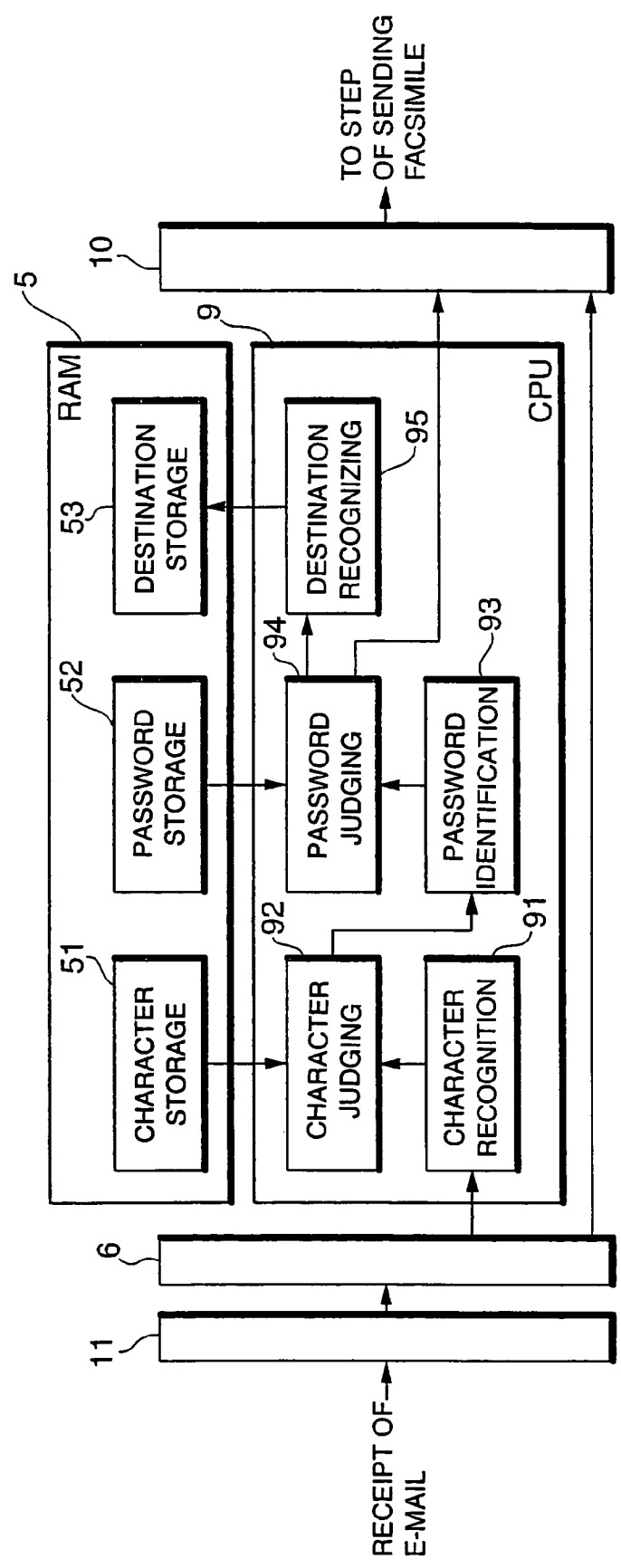
FIG. 3 is a detailed block diagram showing internal configurations of a RAM and a CPU shown in FIG. 2.

FIG. 3 is a block diagram showing detailed internal configurations of the RAM 5 and CPU 9 shown in FIG. 2. As illustrated in FIG. 3, the RAM 5 has a relay identification character storing section 51, a password information storing section 52, and a destination information storing section 53 and the CPU 9 has a relay identification character recognizing section 91, a relay identification character judging section 92, a password identifying section 93, a password judging section 94, and a destination information recognizing section 95.

Figure 4:
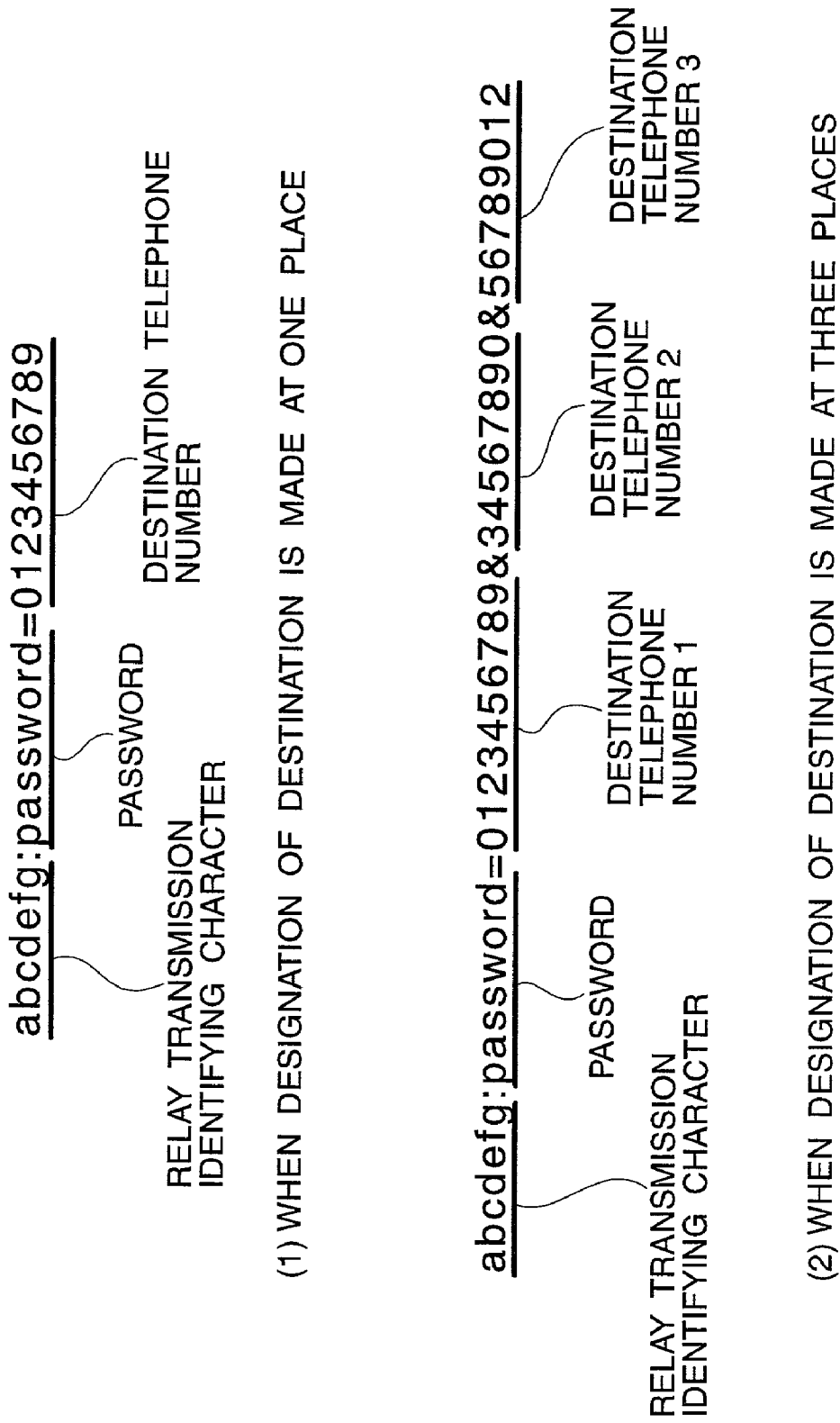
FIG. 4 shows one example of a description format in a Subject column for an E-mail header employed when a relay requesting party makes a request asking request of the internet FAX 3a according to the first embodiment of the present invention.

FIG. 4 shows one example of a description format in a Subject column for an E-mail header employed when a relay requesting party makes a request asking a relay transmission of the internet FAX 3a.

FIG. 4 (1) shows one example of a description format in a Subject column for an E-mail header when designation of a destination by a relay transmission requesting party (such as the mail server 1a, internet FAX 3b, or a like) is performed for one destination only. As shown in FIG. 4 (1), the description is made like ["relay transmission identifying character": "password"="destination telephone number"]. FIG. 4 (2) shows one example of a description format in a Subject column for an E-mail header when designation of a destination by a relay transmission requesting party is made for a plurality of destinations. As shown in FIG. 4 (2), the description is made like ["relay transmission identifying character": "password"="destination telephone number 1" & "destination telephone number 2" & "destination telephone number 3"]. Moreover, in the following description (in each of embodiments hereinafter), in some cases, the identifying character for relay transmission is simply called an "identifying character for relay" and the destination telephone number is called as "destination information". The information made up of the identifying character for relay and destination information is called "relay transmission requesting information".

Figure 5:
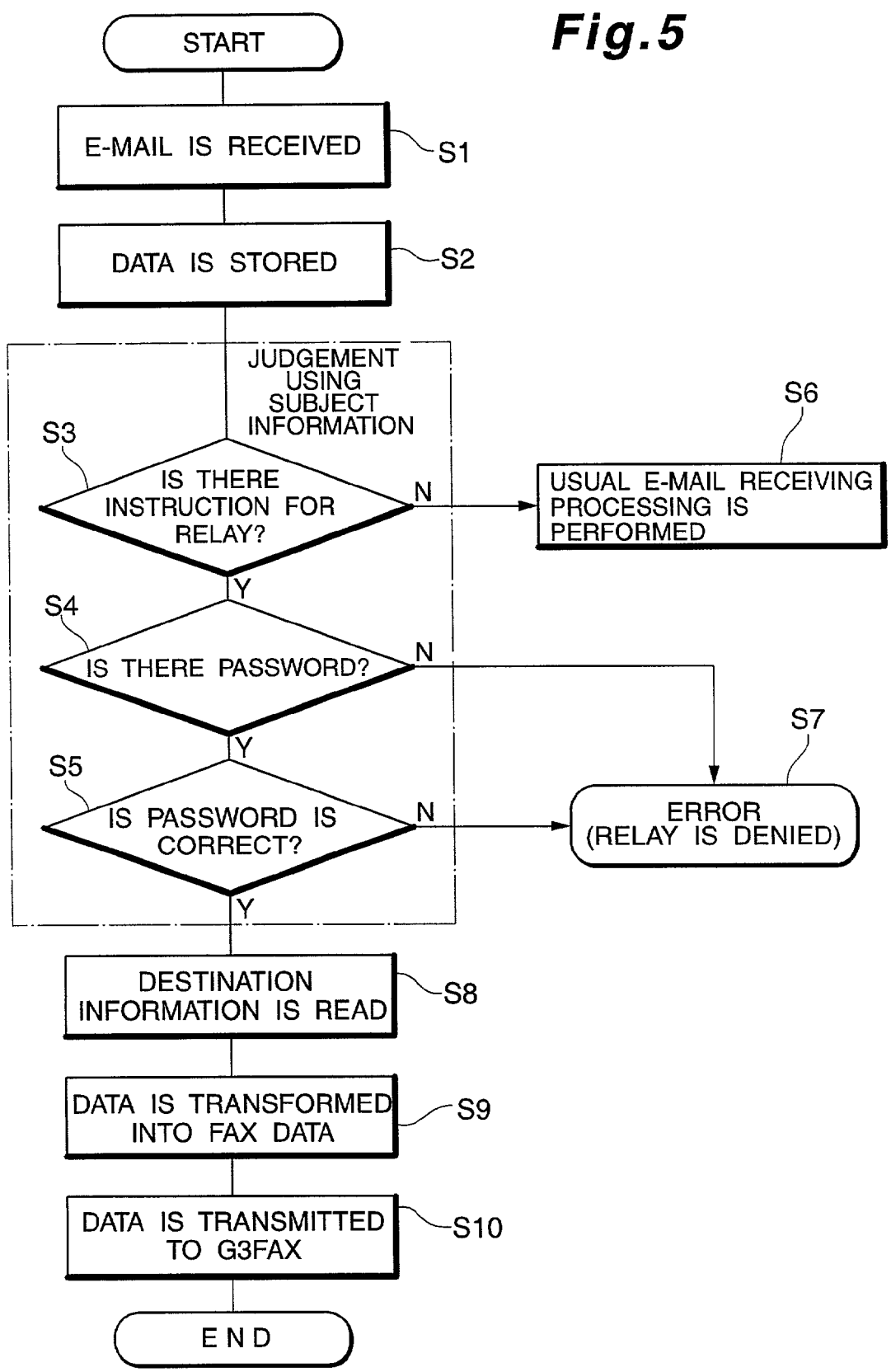
FIG. 5 is a flowchart illustrating an example of operations of a relay communication device (an internet FAX) according to the first embodiment of the present invention.

FIG. 5 is a flowchart illustrating an example of operations of an internet FAX according to the first embodiment of the present invention. Operations of the internet FAX of the first embodiment are explained by referring to FIGS. 2, 3, and 5.

The internet FAX 3a, when having received E-mail using a mail receiving protocol such as a POP (Post Office Protocol) 3, IMAP (Internet Message Access Protocol) 4 through the network interface section 11 (Step S1), stores the received E-mail into the data memory 6 (Step S2).

Next, the CPU 9 reads the Subject information as shown in FIG. 4 from E-mail data stored in the data memory 6, analyzes the Subject information using the relay identification character recognizing section 91, compares the Subject information with an identifying character for relay being stored in the relay identification character storing section 51 using relay identification character judging section 92 and judges whether or not a character matching with any one of the identifying characters for relay exists in the Subject information and, if the character is judged not to exist, performs usual E-mail receiving processing (Step S3 and Step S6).

In Step S3, when the identifying character for relay is judged to exist in the Subject information and the identifying character for relay is judged to be a request for relay transmission, the password information is extracted from the Subject information by the password identifying section 93 and the extracted information is compared with a password being stored in the password information storing section 52 by the password judging section 94, and a judgement as to whether or not the request for relay transmission is accepted is made (Step S4 and Step S5). If the password does not exist in the Subject information and, even if the password exists, if the password does not match with a password being registered in advance in the password information storing section 52, the request for relay transmission is denied and the processing is handled as an error (Step S7).

When the password exists in the above Subject information and if the existing password matches with the password being stored in advance in the password information storing section 52, a request for relay transmission is accepted and destination information (that is, a destination telephone number) is extracted from the Subject information and is stored in the destination information storing section 53 (Step S8).

Then, the E-mail data being stored in the data memory 6 is read by the data format transforming section 10 and is transformed into a data format that can be received and processed by a FAX (Step S9) and the transformed data is transmitted to the G3FAX 23 or 24 through the MODEM 12, FAX section, and PSTN, in accordance with the destination information (Step S10). Moreover, it is needless to say that the password being stored in advance in the password information storing section 52 and the identifying character for relay being stored in advance in the relay identification character storing section 51 can be changed by a prior registration operation.

Thus, according to the internet FAX of the first embodiment, whether or not E-mail is a request for relay transmission by receiving the E-mail in accordance with an E-mail receiving procedure and by analyzing Subject information contained in the received E-mail and, therefore, a method of designating a destination of relay transmission request mail to the internet FAX becomes the same as a method of designating a destination of a transmission mail to the internet FAX, which makes unnecessary time and effort required to make special designation of a destination.

Moreover, according to the internet FAX of the first embodiment, in a network in which the internet FAX is incorporated, time and effort required to register a host name for transferring a facsimile to the DNS is also made unnecessary.

Also, according to the internet FAX of the first embodiment, since the internet FAX does not operate as a contact with an outside, that is, it does not utilize the function of receiving the SMTP, problems associated with the security in the network in which the internet FAX uses a relay function can be solved and, even if the internet FAX does not have the SMTP receiving function, it can accept a request for relay transmission.

Also, according to the internet FAX of the first embodiment, abuse of the relay function of the internet FAX by a third party can be prevented by double walls using the identifying character for relay and the password.

Additionally, according to the internet FAX of the first embodiment, when a request is made for relay transmission to a plurality of destinations, as shown in FIG. 4, the plurality of destination telephone numbers can be described by separating the telephone numbers by a mark "&", the destination designating method can be made simpler and operational mistake can be prevented.

Second Embodiment

Figure 6:
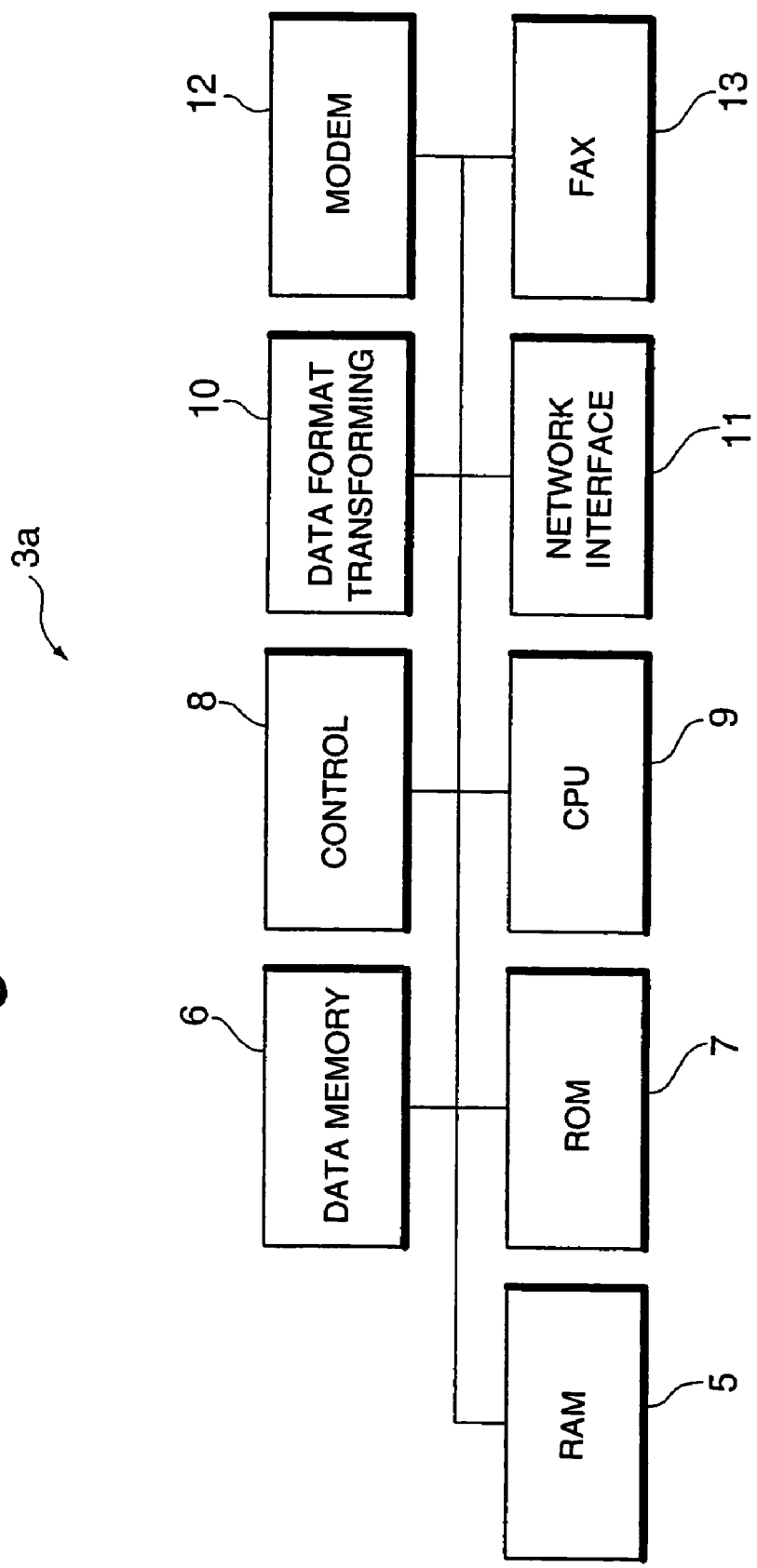
FIG. 6 is a block diagram showing basic configurations of a relay communication device (an internet FAX in the embodiment) according to a second embodiment of the present invention.

FIG. 6 is a block diagram showing basic configurations of an internet FAX according to a second embodiment of the present invention.

As shown in FIG. 6, the internet FAX 3a of the second embodiment includes a RAM 5, a data memory 6, a ROM 7, a control section 8, a CPU 9, a data format transforming section 10, a network interface section 11, a MODEM 12 and a FAX section 13.

Figure 7:
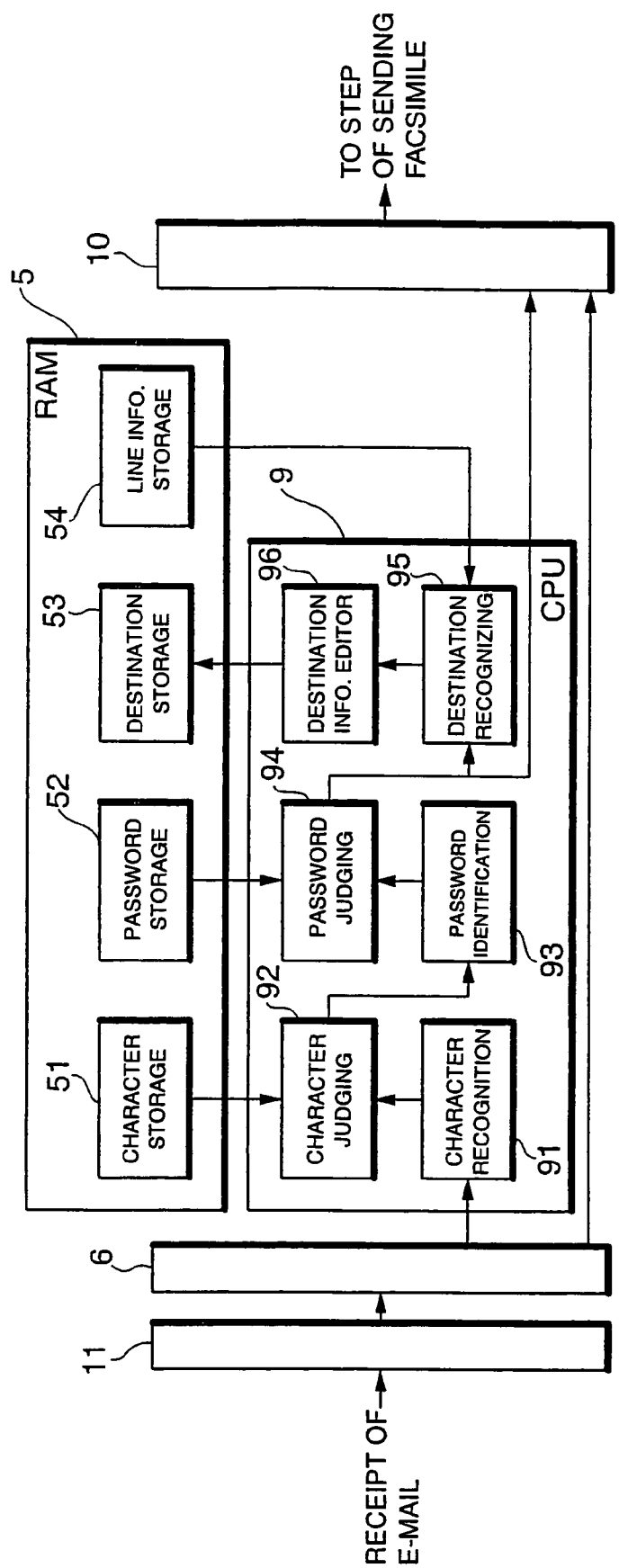
FIG. 7 is a detailed block diagram showing internal configurations of the RAM and CPU shown in FIG. 2.

FIG. 7 is a detailed block diagram showing internal configurations of the RAM 5 and CPU 9 shown in FIG. 6. As shown in FIG. 7, the RAM 5 includes a relay identification character storing section 51, a password information storing section 52, a destination information storing section 53, and a connected line information storing section 54 and the CPU 9 includes a relay identification character recognizing section 91, a relay identification character judging section 92, a password identifying section 93, a password judging section 94, a destination information recognizing section 95, and a destination information editing section 96.

The configurations of the RAM 5 of the second embodiment defer from those in the first embodiment in that the connected line information storing section 54 is provided which is adapted to identify, from a destination telephone number, a line (for example, an extension or outside line) to which a FAX, to which data is relayed, is connected. The configuration of the CPU 9 of the second embodiment defer from those in the first embodiment in that the destination information editing section 96 is provided which is adapted to perform, based on a type of a line to which a FAX, to which data is relayed, is connected and a type of a line to which the internet FAX 3 is connected, specified editing processing such as a process of adding, that is, if the FAX, to which data is relayed, is connected to an outside line and the internet FAX 3 is connected to an extension line, for example, "0" indicating a state of connection to the extension line, to a head of a destination telephone number.

Next, operations of the internet FAX 3a of the second embodiment will be described by referring to FIG. 6 and FIG. 7. The internet FAX 3a, when having received E-mail from a mail server 1a using a protocol for receiving mail (such POP 3, IMAP 4, or a like), stores the received E-mail in the data memory 6.

The CPU 9 reads the Subject information as shown in FIG. 4 from E-mail data stored in the data memory 6, analyzes the Subject information using the relay identification character recognizing section 91, compares the Subject information with an identifying character for relay being stored in the relay identification character storing section 51 using relay identification character judging section 92 and judges whether or not a character matching with any one of the identifying characters for relay exists in the Subject information is judged and, if the character is judged not to exist, performs normal E-mail receiving processing.

On the other hand, if the identifying character for relay is judged to exist in the Subject information and the E-mail is judged to be a request for relay transmission, the password information is extracted from the Subject information by the password identifying section 93 and the extracted information is compared with a password being stored in the password information storing section 52 by the password judging section 94, and then a judgement as to whether or not the request for relay transmission is accepted is made.

If the password exists in the above Subject information and if the existing password matches with a password being stored in advance in the password information storing section 52, a request for relay transmission is accepted and destination information (that is, a destination telephone number) is extracted from the Subject information and, based on information (for example, information about a type of a line including information as to whether a FAX, to which data is relayed, is connected to an extension line or to an outside line or a like, which is judged based on a destination telephone number) being stored in the connected line information storing section 54 by the destination information storing section 53, specified editing processing (such as a process of adding, if the FAX, to which data is relayed, is connected to an outside line and if the internet FAX 3 is connected to an extension line, for example, "0" indicating a state of connection to the extension to a head of a destination telephone number) is performed and, after the editing, the destination information is stored in the destination information storing section 53.

Then, the E-mail data being stored in the data memory 6 is read by the data format transforming section 10 and is transformed into data format that can be received and processed by a FAX and the transformed data is transmitted to the G3FAX 23 or 24 through the MODEM 12, FAX section, and PSTN, in accordance with the destination information. Moreover, it is needless to say that the password being stored in advance in the password information storing section 52 and the identifying character for relay being stored in advance in the relay identification character storing section 51 can be changed by a prior registration operation. In the above description, the information about two types of the line, one being connected to the extension line and another being connected to the outside line is described as information about the type of lines, however, the present invention is not limited to these, that is, the internet FAX may be connected to various lines such as the F-net line, ISDN (Integrated Service Digital Network) line, or a like.

Moreover, editing of destination information may be performed not only by automatic operations but also manual operations. The automatic and manual editing may be also applied to embodiments to be described hereafter.

Thus, according to the internet FAX of the second embodiment, even when the internet FAX having a function of relaying is connected to a line for extension, since a telephone number for transmitting to an outside line is inserted into a head of destination information (that is, destination telephone number), relay transmission is made possible.

Third Embodiment

Figure 8:
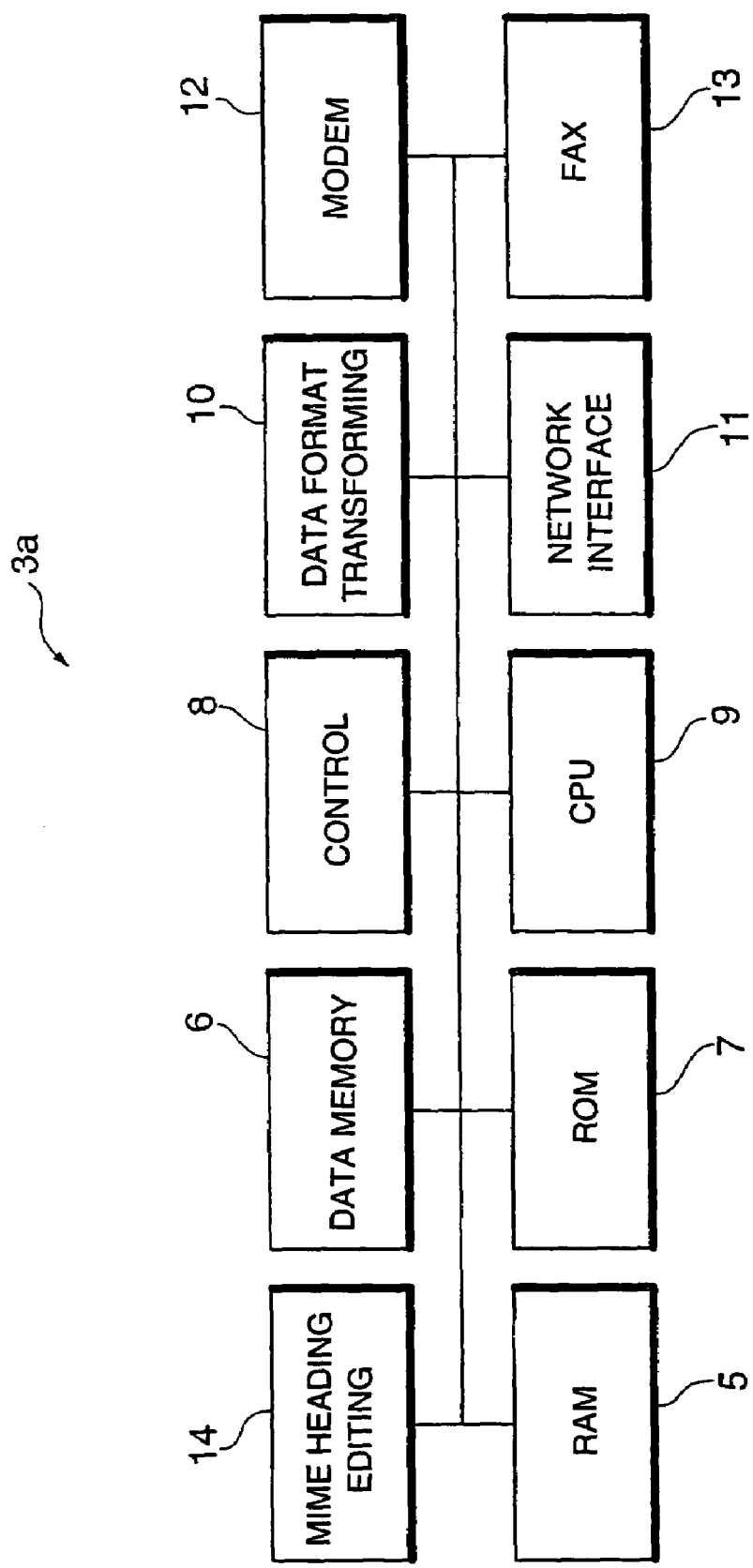
FIG. 8 is a block diagram showing basic configurations of a relay communication device (an internet FAX in the embodiment) according to a third embodiment of the present invention.

FIG. 8 is a block diagram showing basic configurations of an internet FAX according to a third embodiment of the present invention.

As shown in FIG. 8, the internet FAX 3a of the third embodiment includes a RAM 5, a data memory 6, a ROM 7, a control section 8, a CPU 9, a data format transforming section 10, a network interface section 11, a MODEM 12, a FAX section 13, and a MIME header editing section 14. The description hereafter is made presuming that internal configurations of the RAM 5 and CPU 9 are the same as those employed in the first embodiment.

Next, operations of the internet FAX 3a of the third embodiment will be performed by referring to FIGS. 3 and 4. In the third embodiment, for example, an internet FAX 3b serving as a sender side, using a MIME (Multipurpose Internet Mail Extensions) header editing section 14, writes an identifying character for relay into an X-parameter in the MIME header of the relay transmission requesting E-mail at a time of transmission for relay and then makes a request of the internet FAX 3a for relay transmission.

The internet FAX 3a serving as a receiver, when having received E-mail from the mail server 1a, through the network interface section 11, by using the mail receiving protocol such as the POP 3, IMAP 4, or a like, stores the received E-mail into the data memory 6.

The CPU 9 reads an identifying character for relay, password, and destination telephone number (hereinafter, these being referred to as Subject information) as shown in FIG. 4 which have been written in the X-parameter in the MIME header of the E-mail data from E-mail data (relay transmission requesting E-mail) stored in the data memory 6, analyzes the Subject information by using the relay identification character recognizing section 91, compares the Subject information with the identifying character for relay being stored in the relay identification character storing section 51 by using relay identification character judging section 92 and judges whether or not a character matching with any one of the identifying characters for relay exists in the Subject information and, if the character is judged not to exist, performs normal E-mail receiving processing.

If the identifying character for relay is judged to exist in the Subject information and if the E-mail is judged to be a request for relay transmission, the password information is extracted from the Subject information by the password identifying section 93 and the extracted information is compared with a password being stored in advance in the password information storing section 52 by the password judging section 94, and then a judgement as to whether or not the request for relay transmission is accepted is made.

If the password exists in the above Subject information and if the existing password matches with a password being stored in advance in the password information storing section 52, a request for relay transmission is accepted and destination information (that is, a destination telephone number) is extracted from the Subject information and is stored in the destination information storing section 53.

Then, the E-mail data being stored in the data memory 6 is read by the data format transforming section 10 and is transformed into a data format that can be received and processed by a FAX and the transformed data is transmitted to a G3FAX 23 or 24 through the MODEM 12, FAX section, and PSTN, in accordance with the destination information.

Moreover, it is needless to say that the password being stored in advance in the password information storing section 52 and the identifying character for relay being stored in advance in the relay identification character storing section 51 can be changed by a prior registration operation. Furthermore, operations employed in the second embodiment can be applied to the third embodiment.

Thus, according to the internet FAX 3a of the third embodiment, since the identifying character for relay and/or the password is described in the MIME header, inputting of a confidential character at such a conspicuous place as in the Subject column in the mail header is made unnecessary. Therefore, even if the relay transmission requesting mail is transmitted to a wrong destination or to a receiver other than the internet FAX 3a, since the X-parameter in the MIME header is not displayed, it is possible to prevent any confidential character from being known to a third party, thus providing a high level of security.

Fourth Embodiment

Figure 9:
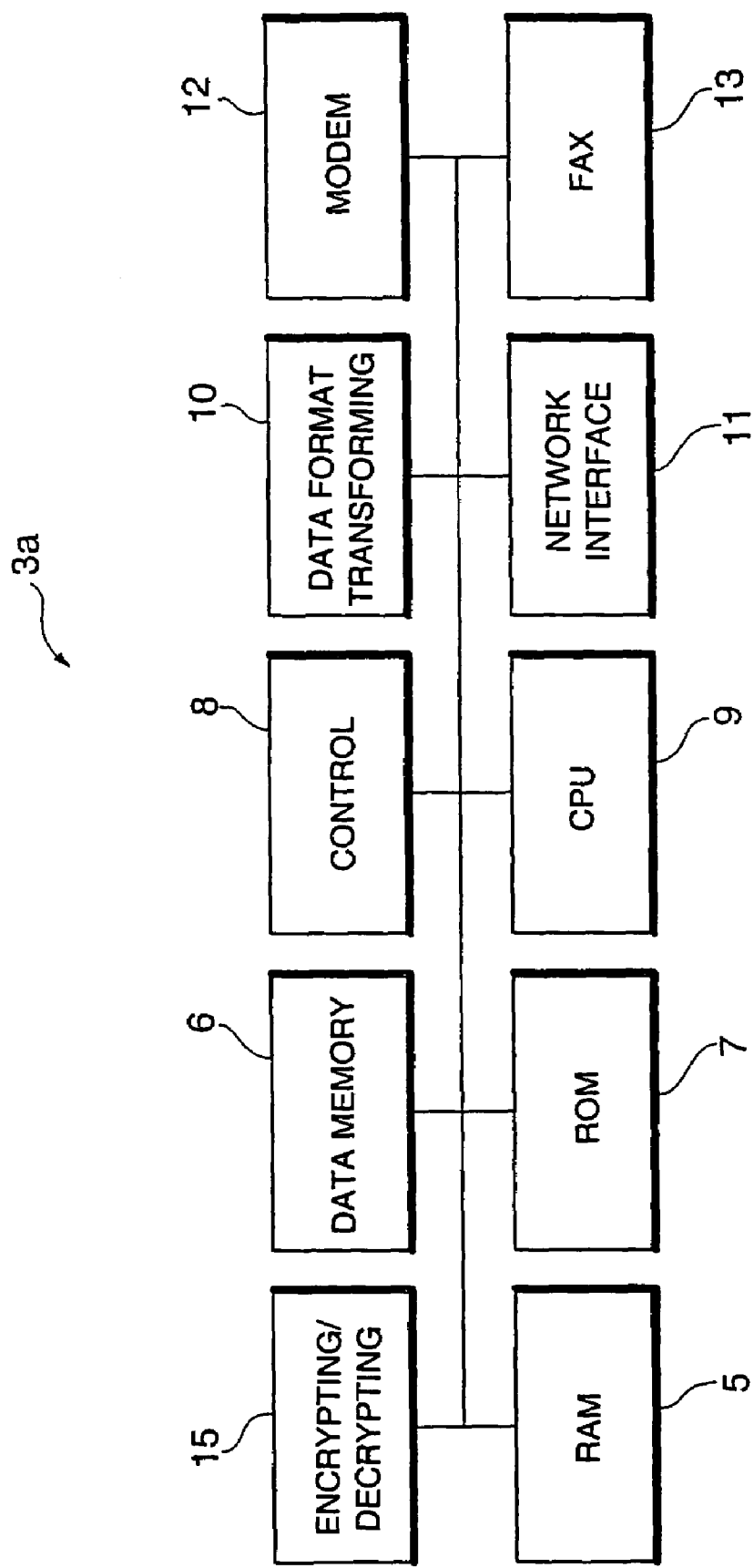
FIG. 9 is a block diagram showing basic configurations of a relay communication device (an internet FAX in the embodiment) according to a fourth embodiment of the present invention.

FIG. 9 is a block diagram showing basic configurations of an internet FAX according to a fourth embodiment of the present invention.

As shown in FIG. 9, the internet FAX 3a of the fourth embodiment includes a RAM 5, a data memory 6, a ROM 7, a control section 8, a CPU 9, a data format transforming section 10, a network interface section 11, a MODEM 12, a FAX section 13, and an encrypting/decrypting section 15. The description hereafter is made presuming that internal configurations of the RAM 5 and CPU 9 in the fourth embodiment are the same as those explained in the first embodiment shown in FIG. 3.

Operations of the internet FAX of the fourth embodiment will be explained by referring to FIG. 3 and FIG. 9. For example, an internet FAX 3b serving as a sender encrypts a relay transmission requesting E-mail by using the encrypting/decrypting section 15 at a time of transmission for relay and makes a request of an internet FAX 3b for the transmission for relay.

The internet FAX 3a serving as a receiver receives E-mail from a mail server 1a through the network interface section 11 by using a mail receiving protocol such as the POP 3, IMAP 4, or a like and decrypts the received E-mail by using the encrypting and decrypting section 15 and then stores the E-mail into the data memory 6.

The CPU 9 reads an identifying character for relay, password, and destination telephone number (hereinafter, these being referred to as Subject information) in the mail header section) as shown in FIG. 4 from a Subject field in the mail header of E-mail data (that is, relay transmission requesting E-mail) stored in the data memory 6, analyzes the Subject information in the mail header section by using the relay identification character recognizing section 91, compares the Subject information with an identifying character for relay being stored in advance in the relay identification character storing section 51 by using the relay identification character judging section 92 and judges whether or not a character matching with any one of the identifying characters for relay exists in the Subject information is judged and, if the character is judged not to exist, performs normal E-mail receiving processing.

If the identifying character for relay is judged to exist in the Subject information and if the E-mail is judged to be a request for relay transmission, the password information is extracted from the Subject information by the password identifying section 93 and the extracted information is compared with a password being stored in advance in the password information storing section 52 by the password judging section 94, and then a judgement as to whether or not the request for relay transmission is accepted made.

If the password exists in the above Subject information and if the existing password matches with a password being stored in advance in the password information storing section 52, a request for relay transmission is accepted and destination information (that is, a destination telephone number) is extracted from the Subject information and is stored in the destination information storing section 53.

Then, the E-mail data being stored in the data memory 6 is read by the data format transforming section 10 and is transformed into a data format that can be received and processed by a FAX and the transformed data is transmitted to a G3FAX 23 or 24 through the MODEM 12, FAX section, and PSTN, in accordance with the destination information.

Moreover, it is needless to say that the password being stored in advance in the password information storing section 52 and the identifying character for relay being stored in advance in the relay identification character storing section 51 can be changed by a prior registration operation. Also, the encrypting and decrypting processing may be performed on entire E-mail or on only relay transmission requesting information. Furthermore, operations employed in the fourth embodiment can be applied to the third embodiment.

Thus, according to the internet FAX of the fourth embodiment, since a relay transmission requesting E-mail is encrypted and a relay transmission request is made of the internet FAX 3a serving as a receiver, it is possible to prevent contents of the Subject column in the mail header from being known by a third party (such as a cracker) while E-mail is being transmitted.

Also, according to the internet FAX of the fourth embodiment, even if a relay transmission requesting mail is transmitted to a wrong destination, that is, to a receiver other than an internet FAX 3a, since the relay transmission E-mail has been encrypted, it is possible to prevent contents (such as the identifying character for relay, password, or a like) in the Subject column in the mail header from being known to a third party, thus providing a high level of security.

It is thus apparent that the present invention is not limited to the above embodiments but may be changed and modified without departing from the scope and spirit of the invention. For example, in the above embodiments, an identifying character for relay, password, and destination telephone number are described in the Subject column in the mail header or in the X-parameter section in the MIME header, however, a method in which such the identifying character for relay password, and destination telephone number may be described in a main body of E-mail and a judgement is made using the main body may be employed. This can be applied to a case in which E-mail is encrypted.

Moreover, in the above embodiments, E-mail information (relay transmission requesting mail) is received through a mail server or by access of the internet FAX to a mail server, however, a method of directly receiving E-mail information by using the internet FAX may be employed.

What is claimed is:

1. A relay communication device for transferring data fed from a requester for relay transmission to a specified destination based on information about a request for relay transmission made up of an identifying character for relay and destination information, said relay communication device comprising:

a data memory used to store mail data in E (Electronic)-mail received;

a relay identifying character information storing unit used to store an identifying character for relay being registered in advance;

a relay identifying character extracting unit to extract said identifying character for relay from said information about a request for relay transmission described in a Subject column in a mail header of said E-mail being stored in said data memory;

a relay identifying character judging unit to judge whether or not said identifying character for relay extracted by said relay identifying character extracting unit is stored in said relay identifying character information storing unit;

a destination information extracting unit to extract, when said identifying character for relay is judged to be stored in said relay identifying character information storing unit by said relay identifying character judging unit, said destination information described in said Subject column in said mail header of said E-mail; and a relay processing unit to perform relay processing based on said destination information extracted by said destination information extracting unit.

2. The relay communication device according to claim 1, wherein said relay processing unit, when said identifying character for relay is judged to be stored by said relay identifying character judging unit, based on destination information on which editing processing is performed by a destination information editing unit used to perform specified editing processing on said destination information based on a type of a connected line identified by said destination information, performs editing processing.

3. The relay communication device according to claim 1, wherein said data memory stores mail data of E-mail decrypted by a decrypting unit which receives E-mail transmitted after being encrypted and decrypts said received E-mail.

4. The relay communication device according to claim 1, wherein said information about a request for relay transmission includes password information and wherein further includes a password information storing unit to store password information being registered in advance, a password information extracting unit to extract password information from said information about a request for relay transmission described in said E-mail being stored in said data memory, and a password information judging unit to judge whether or not said password information extracted by said password information extracting unit is stored in said password information judging unit and wherein said relay processing unit, when said identifying character for relay is judged, by said relay identifying character judging unit, to be stored and said password information is judged, by said password information judging unit, to be stored, extracts said destination information described in said E-mail and performs relay processing based on said destination information.

5. The relay communication device according to claim 1, wherein said E-mail is received through a mail server.

6. The relay communication device according to claim 1, wherein said relay communication device is a facsimile device which transforms mail data of said E-mail into data that is able to be received and processed by said facsimile device and transfers said data based on said destination information and in accordance with facsimile transmission procedures.

7. A relay communication device for transferring data fed from a requester for relay transmission to a specified destination based on information about a request for relay transmission made up of an identifying character for relay and destination information, said relay communication device comprising:

a data memory used to store mail data in E-mail received;

a relay identifying character information storing unit used to store an identifying character for relay being registered in advance;

a relay identifying character extracting unit to extract said identifying character for relay from information about a request for relay transmission described in a MIME (Multipurpose Internet Mail Extension) header being stored in said data memory;

a relay identifying character judging unit to judge whether or not said identifying character for relay extracted by said relay identifying character extracting unit is stored in said relay identifying character information storing unit;

a destination information extracting unit to extract, when said identifying character for relay is judged to be stored in said relay identifying character information storing unit by said relay identifying character judging unit, said destination information described in said MIME header; and a relay processing unit to perform relay processing based on said destination information extracted by said destination information extracting unit.

8. The relay communication device according to claim 7, wherein said relay processing unit, when said identifying character for relay is judged to be stored by said relay identifying character judging unit, based on destination information on which editing processing is performed by a destination information editing unit used to perform specified editing processing on said destination information based on a type of a connected line identified by said destination information, performs editing processing.

9. The relay communication device according to claim 7, wherein said data memory stores mail data of E-mail decrypted by a decrypting unit which receives E-mail transmitted after being encrypted and decrypts said received E-mail.

10. The relay communication device according to claim 7, wherein said information about a request for relay transmission includes password information and wherein further includes a password information storing unit to store password information being registered in advance, a password information extracting unit to extract password information from said information about a request for relay transmission described in said E-mail being stored in said data memory, and a password information judging unit to judge whether or not said password information extracted by said password information extracting unit is stored in said password information judging unit and wherein said relay processing unit, when said identifying character for relay is judged, by said relay identifying character judging unit, to be stored and said password information is judged, by said password information judging unit, to be stored, extracts said destination information described in said E-mail and performs relay processing based on said destination information.

11. The relay communication device according to claim 7, wherein said E-mail is received through a mail server.

12. The relay communication device according to claim 7, wherein said relay communication device is a facsimile device which transforms mail data of said E-mail into data that is able to be received and processed by said facsimile device and transfers said data based on said destination information and in accordance with facsimile transmission procedures.

13. A relay communication device for transferring data fed from a requester for relay transmission to a specified destination based on information about a request for relay transmission made up of an identifying character for relay and destination information, said relay communication device comprising:

a data memory used to store mail data in E-mail received;

a relay identifying character information storing unit used to store an identifying character for relay being registered in advance;

a relay identifying character extracting unit to extract said identifying character for relay from said information about a request for relay transmission described in a main body of said E-mail;

a relay identifying character judging unit to judge whether or not said identifying character for relay extracted by said relay identifying character extracting unit is stored in said relay identifying character information storing unit;

a destination information extracting unit to extract, when said identifying character for relay is judged to be stored in said relay identifying character information storing unit by said relay identifying character judging unit, said destination information described in a main body of said E-mail; and a relay processing unit to perform relay processing based on said destination information extracted by said destination information extracting unit.

14. The relay communication device according to claim 13, wherein said relay processing unit, when said identifying character for relay is judged to be stored by said relay identifying character judging unit, based on destination information on which editing processing is performed by a destination information editing unit used to perform specified editing processing on said destination information based on a type of a connected line identified by said destination information, performs editing processing.

15. The relay communication device according to claim 13, wherein said data memory stores mail data of E-mail decrypted by a decrypting unit which receives E-mail transmitted after being encrypted and decrypts said received E-mail.

16. The relay communication device according to claim 13, wherein said information about a request for relay transmission includes password information and wherein further includes a password information storing unit to store password information being registered in advance, a password information extracting unit to extract password information from said information about a request for relay transmission described in said E-mail being stored in said data memory, and a password information judging unit to judge whether or not said password information extracted by said password information extracting unit is stored in said password information judging unit and wherein said relay processing unit, when said identifying character for relay is judged, by said relay identifying character judging unit, to be stored and said password information is judged, by said password information judging unit, to be stored, extracts said destination information described in said E-mail and performs relay processing based on said destination information.

17. The relay communication device according to claim 13, wherein said E-mail is received through a mail server.

18. The relay communication device according to claim 13, wherein said relay communication device is a facsimile device which transforms mail data of said E-mail into data that is able to be received and processed by said facsimile device and transfers said data based on said destination information and in accordance with facsimile transmission procedures.

* * * * *